United States Patent Office 3,375,167
Patented Mar. 26, 1968

3,375,167
6 - HYDROXYMETHYL - 3 - OXO - 4,6 - DIENIC STEROIDS, ACYL DERIVATIVES THEREOF, AND PROCESS FOR PREPARING SAME
Derek Burn, Michael George Lester, and Vladimir Petrow, London, England, assignors to The British Drug Houses Limited
No Drawing. Filed May 20, 1965, Ser. No. 457,522
Claims priority, application Great Britain, June 3, 1964, 22,960/64; Sept. 1, 1964, 35,827/64
28 Claims. (Cl. 167—74)

This application is related to co-pending application S.N. 457,491 filed on May 20, 1965, and having a common inventor and common assignee.

This invention is for improvements in or relating to organic compounds and has particular reference to steroidal materials containing a hydroxymethyl substituent at $C_6$.

It is an object of the present invention to provide a new and general process for the preparation of a new series of steroidal products, namely, 6-hydroxymethyl-3-oxo-4,6-dienic steroids and acyl derivatives thereof, including the partial Formula I below.

The process of this invention is a discovery of considerable importance in the field of steroid technology. The 6-hydroxy (acyloxy)methyl-3-oxo-4,6-dienic steroids represent a hitherto unknown group of compounds, many of which possess valuable biological properties. Thus, for example, the derivatives of 17β-hydroxyandrostane which fall within the scope of the present invention may possess anabolic, androgenic, gonadotrophin-inhibiting, and claudogenic properties. The derivatives of 17α-acyloxypregnan-20-one which fall within the scope of the present invention may possess progestational and gonadotrophin-inhibiting properties. In conjunction with an oestrogen such for example as ethynyloestradiol, mestranol, 17α-chlorethynyl oestradiol and its 3-methyl and 3,17-dimethyl ether, 17α-trifluoropropynyl oestradiol and its 3-methyl and 3,17-dimethyl ether, 17α-trifluorovinyl oestradiol and its 3-methyl and 3,17-dimethyl ether, the compounds of the present invention and in particular 17α-acetoxy-6-hydroxy (acyloxy) methylpregna-4,6-diene-3,20-dione are of value as oral contraceptives. Such formulations may be administered as pills, tablets and other standard pharmaceutical formulations either in the conventional 20 days/month regimens or in sequential or serial regimens. The progestationally active 17α-acyloxypregnan-20-one derivatives are of value in various gynaecological disorders such as dysmenorrhea, in endometriosis, disfunctional uterine bleeding, premenstrual tension syndrome, the postponement of normal menstruation, primary and secondary amenorrhea, sub-fertility, and inhibition of lactation, and may be administered in standard pharmaceutical formulations for these purposes. The derivatives of 16α,17α-isopropylidenedioxypregnan-20-one and analogues thereof may likewise show progestational activity, anti-inflammatory activity, and anti-endotoxic activity. Glucocorticoid activity will, in general, be shown by derivatives of 9α-fluoro-11β,17α,21-trihydroxy-pregnan-20-one,17α,21-dihydroxypregnane - 11,20-dione, 11β,17α,21-trihydroxypregnan-20-one and by the 21-acyl and 17,21-diacyl derivatives thereof. The compounds of the present invention also form exceptionally convenient intermediates for the preparation of therapeutically valuable 6-substituted-6-dehydro steroidal hormones of the androstane and pregnane series.

It is a further object of the present invention to provide pharmaceutical preparations of the biologically active materials in admixture with one or more solid or liquid pharmaceutically acceptable inert carriers.

The present invention provides new 6-hydroxy- and acyloxy-methyl-3-oxo-4,6-dienic steroids including the partial Formula I below.

The invention provides the following new compounds:

17β-acetoxy-6-hydroxymethyl - 19 - nor - androsta-4,6-dien-3-one which has claudogenic properties.

6 - hydroxymethy-16α,17α-isopropylidenedioxypregna-4,6-diene-3,20-dione which has progestational, claudogenic, anti-endotoxic and ovulation inhibition properties.

17α-acetoxy-6-hydroxymethyl - 16 - methylenepregna-4,6-diene-3,20-dione which has progestational, anti-endotoxic, anti-ovulatory properties.

21 - acetoxy - 6 - acetoxymethyl-17α-hydroxypregna-4,6-diene-3,11,20-trione which has anti-andotoxic properties.

17α - acetoxy - 6 - hydoxymethylpregna-4,6-diene-3,20-dione which has progestational, anti-ovulatory and gonadotrophin-inhibiting properties.

17α - acetoxy - 6 - acetoxymethylpregna-4,6-diene-3,20-dione which has progestational, anti-ovulatory and gonadotrophin-inhibiting properties.

17β - acetoxy - 6 - hydroxymethylandrosta-4,6-diene-3-one which has anabolic and androgenic properties.

11β - hydroxy - 6 - hydroxymethylandrosta-4,6-diene-3,17-dione which has anabolic and androgenic properties.

17α - acetoxy - 6 - hydroxymethyl-16α-methylpregna-4,6-diene-3,20-dione which has progestational, anti-ovulatory and gonadotrophin-inhibiting properties.

6-hydroxymethylandrosta-4,6-diene-3,17-dione, which has androgenic and anabolic properties.

17β-hydroxy-6-hydroxymethyl-17α-methylandrosta-4,6-dien-3-one, which has anabolic and androgenic properties.

11β-hydroxy-6-hydroxymethylpentara-4,6,17(20)-triene-3,21-dione, which has claudogenic and anti-endotoxic properties.

21-acetoxy-11β,17α-dihydroxy-6-hydroxymethylpregna-4,6-diene-3,20-dione, which has anti-endotoxic, anti-ovulatory and gonadotrophin-inhibiting properties.

21-acetoxy-17α-hydroxy-6-hydroxymethylpregna-4,6-diene-3,11,20-trione and 21-acetoxy-11β,17α-dihydroxy-9α-fluoro-6-hydroxymethylpregna-4,6-diene-3,20-dione which have anti-endotoxic properties.

17α-acetoxy-6-propionoxymethylpregna-4,6-diene-3,20-dione,

17α-acetoxy-6-(β-phenylpropionoxy)methylpregna-4,6-diene-3,20-dione,

17α-acetoxy-6-phenoxyacetoxymethylpregna-4,6-diene-3,20-dione,

17α-acetoxy-6-caproyloxymethylpregna-4,6-diene-3,20-dione,

17α-acetoxy-6-acetoxymethyl-16-methylenepregna-4,6-diene-3,20-dione,

17α-acetoxy-16-methylene-6-propionoxymethylpregna-4,6-diene-3,20-dione,

17α-acetoxy-16-methylene-6-(β-phenylpropionoxy) methylpregna-4,6-diene-3,20-dione, 17α-acetoxy-16-methylene-6-phenoxyacetoxymethyl-pregna-4,6-diene-3,20-dione and 17α-acetoxy-6-caproyloxymethyl-16-methylenepregna-4,6-diene-3,20-dione which have progestational, anti-ovulatory and gonadotrophin-inhibiting properties.

According to the present invention there is provided a process for the preparation of 6-hydroxy- or acyloxy-methyl-3-oxo-4,6-dienic steroids including the partial formula

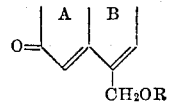

(I)

where R is H or an acyl group, which process comprises treating a 3-enol ether of a 6-hydroxymethyl steroid or acyl derivative thereof including the partial formula

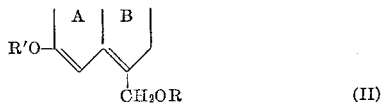

where R is as hereinabove defined and R' is an alkyl, chloralkyl, hydroxyalkyl, cycloalkyl or alkaryl group with a dehydrogenating reagent.

An unexpected feature of the present invention is the rapidity and ease with which the 6-hydroxy- or acyloxymethyl-3-oxo,4,6-dienic steroids (I) are formed from the corresponding 3-enol ethers (II).

Conversion of the 3-enol ether derivatives into the corresponding 6-hydroxy- or acyloxy-methyl-3-oxo-4,6-dienic steroids may be effected by employing dehydrogenating agents under carefully regulated conditions.

In a preferred form of the present invention, the 3-enol ether derivative is treated with 2,3-dichloro-5,6-dicyanobenzoquinone in an aqueous, water miscible, organic solvent such, for example, as aqueous acetone. Not less than one molecular proportion of the dehydrogenating agent is employed, and the reaction is generally complete within 10 minutes at room temperature.

Other water miscible organic solvents such, for example, as the lower aliphatic alcohols, dioxan, tetrahydrofuran, or dimethylformamide may also be employed but, in general, offer no advantage over the preferred form of the present invention.

Other dehydrogenating agents such, for example, as 2,3-dicyano-1,4-benzoquinone, 2,3-dibromo-5,6-dicyanobenzoquinone, chloranil, tetrachlorodiphenoquinone may also be employed but, in general, offer no advantage over the preferred form of the present invention.

At the completion of the reaction, the mixture is processed by methods well-known to those skilled in the art, and the 6-hydroxy(acyloxy)methyl-3-oxo-4,6-dienic steroid (I) is isolated and purified by standard techniques.

According to the disclosure of copending application Ser. No. 457,491 and now abandoned filed concurrently herewith, there is provided an alternative process for the preparation of 6-hydroxy- or acyloxy methyl-3-oxo-4,6-dienic steroids including the partial formula

where R is hydrogen or a lower acyl group containing up to six carbon atoms which process comprises reacting a corresponding 6-hydroxy (acyloxy) methyl 3-enol ether of a 3-oxo-$\Delta^4$-steroid including the partial formula

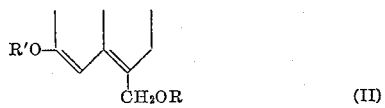

where R has the same meaning as above and R' is a lower alkyl group with an equivalent amount of a halogen in an inert solvent and in the presence of at least one equivalent amount of a strong proton acceptor.

The 6-hydroxy (acyloxy) methyl 3-enol ether of a 3-oxo-$\Delta^4$-steroids (II) is dissolved in an inert solvent, such for example as methylene dichloride containing at least one equivalent proportion of a strong proton acceptor, such for example, as pyridine, and the solution treated, preferably in the temperature region of 0° C., with one equivalent proportion of a halogen, preferably bromine, which may be dissolved in a convenient volume of an inert solvent, such as methylene dichloride. The mixture is permitted to stand for several minutes, and is then processed by extraction with a suitable solvent, such as ether. The crude reaction product thus obtained, may, however, still contain halogen in a combined form. If this is the case, such a crude product may be warmed with a dehydrohalogenating agent, for example, pyridine when a halogen-free material will be obtained, which may then be purified by methods well known to those skilled in the art to give the required 6-hydroxy (acyloxy) methyl-3-oxo-4,6-dienic steroid.

There is also provided a process for the preparation of 6-acyloxymethyl-3-oxo-4,6-dienic steroids including the partial Formula I where R is an acyl group (containing up to 10 carbon atoms) which process comprises treating a 6-hydroxymethyl-3-oxo-4,6-dienic steroid including the partial Formula I where R is H with an acylating reagent.

The acylating reagent as known to those skilled in the art may be for example the appropriate acid anhydride in a base such as pyridine, the appropriate acyl halide in a base such as pyridine or the appropriate acid and toluene p-sulphonyl chloride in a base such as pyridine.

The process of the invention may be applied to 6-hydroxy (acyloxy) methyl 3-enol ethers of 3-oxo-$\Delta^4$-steroids derived from androstane, D-homoandrostane, 19-norandrostane, pregnane, D-homo pregnane and 19-norpregnane.

The 3-enol ether 6-hydroxymethyl starting materials (II) used in the present invention are described in our United States Patent No. 3,095,411. They are prepared from 6-formyl-3-enol ethers of steroidal 3-oxo-4-enes which may be additionally substituted by Hydroxyl and acyloxy groups and functional derivatives thereof in such positions as 11, 12, 16 (including 16-hydroxy methyl), 14, 15, 17, 18, 19, 20 and 21 (including the condensation products of 16α,17α-glycols with carbonyl components). Thiol groups at $C_{16}$ are unaffected.

Carbonyl groups such for example as carbonyl groups at 11, 12, 15, 16, 17, 18 and 20.

Carbalkoxy groups at $C_{13}$, $C_{16}$, $C_{17}$, $C_{20}$ or in the sidechain.

Cyano groups at $C_{13}$, $C_{16}$ and $C_{17}$.

Alkyl groups, in particular Me groups at $C_2$, $C_{11}$, $C_{16}$, $C_{17}$, $C_{21}$ and ethyl at $C_{17}$.

Alkenyl and alkynyl groups in particular vinyl and allyl, trifluoropropynyl, trifluorovinyl, ethynyl, propynyl and chlorethynyl at $C_{17}$.

Methylene, halomethylene and ethylidene groups at $C_{11}$, $C_{16}$ and $C_{17}$.

Groups such as benzylidene at $C_{21}$. Methylene, halo- and carboxy methylene at $C_{16}$:$C_{17}$.

Lactone, ether and spiroketal residues: Spirolactone residues such as —O·CO·CH$_2$·CH$_2$— attached to $C_{17}$, etheric groups at $C_{16}$, and bridging $C_{18}$ and $C_{20}$, spiroketal moieties such as are present in diosgenone, 20,20-ethylenedioxy groups, 17,17-ethylenedioxy groups and similar functional derivatives.

Halogen groups and in particular chlorine and fluorine at $C_9$, $C_{16}$ and $C_{21}$. Halomethyl at $C_{16}$.

Unsaturated linkages in particular at $C_{9(11)}$, $C_{11}$, $C_{14}$, $C_{16}$ and $C_{17(20)}$.

Ketol groups in practicular acylated ketol groups at $C_{16}$–$C_{17}$, $C_{17}$–$C_{20}$ and $C_{20-21}$.

Cortical side chains, both acylated, or converted into such "protective" derivatives as bismethylenedioxy, cyclic-carbonates, cyclic acetonides or orthoformates.

Epoxides and halohydrins particularly at $C_{16-17}$.

The 3-enol ethers of the steroidal 3-oxo-4-enes are reacted with the Vilsmeier reagent in a solvent such as methylenedichloride at 0° C. followed by hydrolysis of the resulting iminium salts when the corresponding 6-formyl derivatives are obtained. Reduction of these 6-formyl derivatives as described in our United States Patent No. 3,095,411 for example catalytically with Raney nickel (rendered non-alkaline for example by ethyl acetate treatment) or with platinum on charcoal (in a sodium acetate buffer) yields the required 6-hydroxymethyl derivatives (II).

The process of invention may be applied to the 6- hydroxy (acyloxy)methyl derivatives derived from the following steroids and acyl derivatives thereof:

testosterone and 19-nor derivatives thereof
2-methyltestosterone and 19-nor derivatives thereof
17α-methyltestosterone and 19-nor derivatives thereof
9(11)-dehydro-17α-methyltestosterone and 19-nor derivatives thereof
17α-propynyltestosterone, 17α-chlorethynyl, 17α-trifluoropropynyl, 17α-trifluorovinyl testosterone and 19-nor derivatives thereof
17α-acyloxyprogesterones and 19-nor derivatives thereof
9(11)-dehydro-17α-acyloxyprogesterones
16-methyl-17α-acyloxyprogesterones, 16-halomethyl-17α-acyloxyprogesterones
9(11)-dehydro-16-methyl-17α-acyloxyprogesterones
16-methylene-17α-acyloxyprogesterones, 16-halomethylene-17α-acyloxyprogesterones
9(11)-dehydro-16-methylene-17α-acyloxyprogesterones
17α-acyloxy-16-ethylideneprogesterones
16α,17α-dimethylmethylenedioxyprogesterone
9(11)-dehydro-16α,17α-dimethylmethylenedioxyprogesterone cortisone
16-methylcortisone, 16-halomethylcortisone and the 21-fluoro derivatives thereof
21-methylcortisone and the 21-fluoro derivatives thereof
16-methylenecortisone, 16-halomethylenecortisone and the 21-fluoro derivatives thereof
16α-hydroxyhydrocortisone and the (16α,17α)-acetonide thereof
hydrocortisone
16-methylhydrocortisone, 16-halomethylhydrocortisone and the 21-fluoro derivatives thereof
21-methylhydrocortisone and the 21-fluoro derivatives thereof
16-methylenehydrocortisone, 16-halomethylenehydrocortisone and the 21-fluoro derivatives thereof
16α-hydroxyhydrocortisone and the (16α,17α)-acetonide thereof
17α,21-dihydroxypregna-4,9(11)-diene-3,20-dione
16-methyl-17α,21-dihydroxypregna-4,9(11)-diene-3,20-dione
21-methyl-17α,21-dihydroxypregna-4,9(11)-diene-3,20-dione
16-methylene-17α,21-dihydroxypregna-4,9(11)-diene-3,20-dione
16α-hydroxy-17α,21-dihydroxypregna-4,9(11)-diene-3,20-dione and the (16,17)-acetonide thereof
21-fluoro-16α,17α-dihydroxypregna-4,9(11)-diene-3,20-dione and the (16,17)-acetonide thereof
21-fluoro-16α,17α-dihydroxypregna-4-ene-3,11,20-trione and the (16,17)-acetonide thereof
21-fluoro-11,16α,17α-trihydroxypregn-4-ene-3,20-dione and the (16,17)-acetonide thereof
21-hydroxypregna-4,17-dien-3-one
11-oxo-21-hydroxypregna-4,17-dien-3-one
11,21-dihydroxypregna-4,17-dien-3-one
9(11)-dehydro-21-hydroxypregna-4,17-dien-3-one
3-oxopregna-4,17-dien-21-oic acid (esters)
3,11-dioxopregna-4,17-dien-21-oic acid (esters)
11-hydroxy-3-oxopregna-4,17-dien-21-oic acid (esters)
9(11)-dehydro-3-oxopregna-4,17-dien-21-oic acid (esters)
21-fluoro-17α-acyloxyprogesterones
progesterone
16-methylprogesterone
11-oxoprogesterone
9(11)-dehydroprogesterone
21-methylprogesterone
diosgenone
17α-cyano-17β-hydroxyandrost-4-en-3-one
16 (α and β)-hydroxytestosterone and 19-nor derivatives
16-methyl-16,17-dehydroprogesterone
16-cyano-progesterone
16-carbalkoxyprogesterones
16-hydroxymethylprogesterone
3-(3-oxo-17β-hydroxyandrost-4-en-17α-yl)propionic acid 21-fluoroprogesterone
testololactone
16-fluoro-corticoids.

The 9α-fluoro derivatives of the above 11β-hydroxy and 11-oxo-steroids.

Following is a description by way of example of methods of carrying the invention into effect.

*Example 1.—17α-acetoxy-6-hydroxymethylpregna-4,6-diene-3,20-dione*

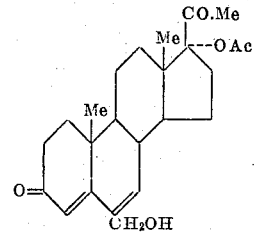

A solution of 2,3-dichloro-5,6-dicyanobenzoquinone (0.63 g.) in 7 ml. of 95% aqueous acetone (i.e. 95 vols acetone and 5 vols water) was added dropwise during two minutes to a stirred solution of 17α-acetoxy-6-hydroxymethyl-3-methoxypregna-3,5-dien-20-one (1 g.) in 100 ml. of 95% aqueous acetone. The mixture was stirred for a further three minutes, then filtered through a short column of alumina. Removal of the solvent from the filtrate gave a solid which was purified from aqueous methanol. 17α-acetoxy-6-hydroxymethylpregna-4,6-diene-3,20-dione separated in needles, M.P. 118–120° C., $[\alpha]_D + 16°$ (chloroform), $\lambda_{max.}^{EtOH}$ 284 mμ (ε 21,900)

*Example 2*

The process of Example 1 was repeated using 95% aqueous ethanol in place of 95% aqueous acetone. 17α-acetoxy-6-hydroxymethylpregna-4,6 - diene - 3,20 - dione, M.P. 118–120° C. was obtained.

*Example 3*

The process of Example 1 was repeated using 95% aqueous dioxan in place of 95% aqueous acetone. 17α-acetoxy - 6 - hydroxymethylpregna - 4,6-diene-3,20-dione, M.P. 118–120° C. was obtained.

*Example 4*

The process of Example 1 was repeated using 95% aqueous dimethylformamide in place of 95% aqueous acetone. 17α - acetoxy-6-hydroxymethylpregna-4,6-diene-3,20-dione. M.P. 118–120° C. was obtained.

*Example 5*

The process of Example 1 was repeated using 2,3-dicyano-1,4-benzoquinone in place of 2,3-dichloro-5,6-dicyanobenzoquinone. 17α - acetoxy - 6 - hydroxymethylpregna-4,6-diene-3,20-dione, M.P. 118–120° C. was obtained.

*Example 6*

The process of Example 1 was repeated using chloranil in place of 2,3-dichloro-5,6-dicyanobenzoquinone. 17α-acetoxy-6-hydroxymethylpregna-4,6 - diene -,3,20 - dione, M.P. 118–120° C. was obtained.

*Example 7*

The process of Example 1 was repeated using 2,3-dibromo-5,6-dicyanobenzoquinone in place of 2,3-dichloro-5,6-dicyanobenzoquinone. 17α-acetoxy-6-hydroxymethylpregna-4,6-diene-3,20-dione, M.P. 118–120° C., was obtained.

*Example 8*

The process of Example 1 was repeated using tetrachlorodiphenoquinone in place of 2,3-dichloro-5,6-dicyanobenzoquinone. 17α-acetoxy-6-hydroxymethylpregna-4,6-diene-3,20-dione, M.P. 118–120° C., was obtained.

*Example 9.—17α-acetoxy-6-acetoxymethylpregna-4,6-diene-3,20-dione*

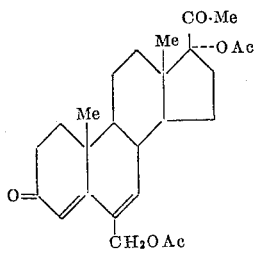

A solution of 17α-acetoxy-6-hydroxymethyl-3-methoxypregna-3,5-dien-20-one (4 g.) in a mixture of pyridine (10 ml.) and acetic anhydride (4 ml.) was allowed to stand overnight at room temperature. Water was then added dropwise to the stirred solution at 0° C. until crystals began to separate. More water was added gradually until precipitation of crystals was complete. The product was collected, washed and purified from aqueous acetone to give 17α-acetoxy-6-acetoxymethyl-3-methoxypregna-3,5-dien-20-one, M.P. 117.5 to 118.5° C.

$\lambda_{max.}^{EtOH}$ 251 m$\mu$ ($\epsilon$=21,870)

A solution of 2,3-dichloro-5,6-dicyanobenzoquinone (0.4 g.) in 40 ml. of 95% aqueous acetone was added dropwise during three minutes to a stirred solution of 17α-acetoxy-6-acetoxymethyl-3-methoxypregna - 3,5 - dien-20-one (0.7 g.) in 70 ml. of 95% acetone. The mixture was stirred at room temperature for a further two minutes, poured into water and the product extracted with ether. The extract was washed with water, dilute aqueous sodium hydroxide, then with water and dried. Removal of the solvent, and crystallisation of the residue from methanol gave 17α - acetoxy-6-acetoxymethylpregna-4,6-diene-3,20-dione, M.P. 189.5 to 190.5° C.

$\lambda_{max.}^{EtOH}$ 279 m$\mu$ ($\epsilon$=26,020)

Treatment of the foregoing product (0.1 g.) in acetone (4 ml.) with 0.2 N aqueous sodium hydroxide (1 ml.) for 15 minutes at room temperature followed by dilution with water gave 17α-acetoxy-6-hydroxymethylpregna-4,6-diene-3,20-dione, M.P. 118–120° C., identical with that obtained in Example 1.

*Example 10.—17β-acetoxy-6-hydroxymethyl-19-norandrosta-4,6-dien-3-one*

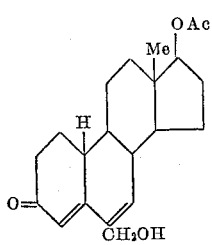

A solution of 2,3-dichloro-5,6-dicyanobenzoquinone (0.2 g.) in 5 ml. of 95% aqueous acetone was added dropwise during two minutes to a stirred solution of 17β-acetoxy-6-hydroxymethyl-3 - methoxy - 19 - norandrosta-3,5-diene (0.25 g.) in 25 ml. of 95% acetone. The mixture was stirred for a further two minutes at room temperature, then poured onto a column of neutral alumina. Elution with acetone afforded a gum which was purified by re-chromatography on neutral alumina in benzene solution. Elution with benzene-ether mixtures gave 17β-acetoxy-6-hydroxymethyl-19-norandrosta-4,6 - dien - 3 - one, M.P. 188–190° C. (from aqueous methanol)

$\gamma_{max.}^{CH_2Cl_2}$ 3580, 1745, 1675, 1635 and 1585 cm.$^{-1}$, $\lambda_{max.}^{EtOH}$ 284 m$\mu$ ($\epsilon$ 23,120)

*Example 11.—6-hydroxymethyl-16α,17α-isopropylidenedioxypregna-4,6-diene-3,20-dione*

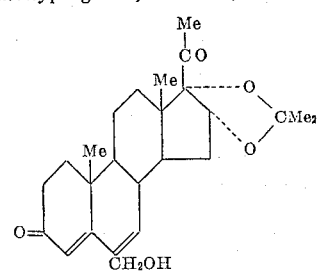

A solution of 2,3-dichloro-5,6-dicyanobenzoquinone (.227 gm.) in 10 ml. of 95% aqueous acetone was added dropwise during two minutes to a stirred solution of 3-ethoxy-6-hydroxymethyl - 16α,17α - isopropylidenedioxypregna-3,5-dien-20-one (0.4 g.) in 40 ml. of 95% acetone. The mixture was stirred for a further three minutes and poured onto a column of neutral alumina (10 g.). Elution with acetone gave a solid which was crystallised from aqueous methanol to give 6-hydroxymethyl-16α,17α-isopropylidenedioxypregna-4,6-diene - 3,20 - dione, M.P. 200–201° C., [α]$_D$ +58.9° (c, 1.06 in dioxan)

$\lambda_{max.}^{EtOH}$ 283 m$\mu$ ($\epsilon$ 22,340)

*Example 12.—17α-acetoxy-6-hydroxymethyl-16-methylenepregna-4,6-diene-3,20-dione*

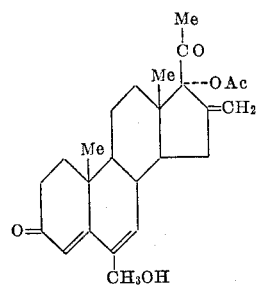

A solution of 2,3-dichloro-5,6-dicyanobenzoquinone (0.26 g.) in 10 ml. of 95% aqueous acetone was added dropwise during two minutes to a stirred solution of 17α-acetoxy-6-hydroxymethyl - 3 - methoxy - 16 - methylenepregna-3,5-dien-20-one (0.5 g.) in 50 ml. of 95% aqueous acetone. The mixture was stirred for a further two minutes and poured onto a column of neutral alumina (40 g.). Elution with acetone gave a gum which was triturated with ether and crystallised from aqueous methanol to give 17α-acetoxy-6-hydroxymethyl - 16 - methylenepregna-4,6-diene-3,20-dione, M.P. 178–180° C., [α]$_D$ —117.1° (chloroform), $\lambda_{max.}^{EtOH}$ 283 m$\mu$ ($\epsilon$, 22,900)

*Example 13.—21-acetoxy-6-acetoxymethyl-17α-hydroxypregna-4,6-diene-3,11,20-trione*

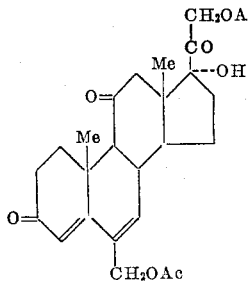

A solution of 2,3-dichloro-5,6-dicyanobenzoquinone (0.45 g.) in 95% aqueous acetone (45 ml.) was added dropwise over 5 minutes to a stirred solution of 21-acetoxy - 6 - acetoxymethyl - 17α-hydroxy - 3 - methoxypregna-3,5-dien-11,20-dione (0.3 g.) (total crude product obtained by treating 21-acetoxy-17α-hydroxy-6-hydroxymethyl-3-methoxypregna-3,5-dien-11,20-dione with acetic anhydride and pyridine overnight at room temperature) in 95% aqueous acetone (30 ml.). After 90 minutes the mixture was diluted with water and the product was extracted into ether. Evaporation of the water-washed and dried (Na$_2$SO$_4$) extract afforded a residue which was crystallised from aqueous methanol to give 21-acetoxy-6-acetoxymethyl - 17α-hydroxypregna - 4,6-diene-3,11,20-trione, $\lambda_{max.}^{EtOH}$ 275 mμ (ε, 24,000), $\gamma_{max.}^{Nujol}$ 3400, 1738, 1710, 1660, 1640 and 1585 cm$^{-1}$

Example 14.—17β-acetoxy-6-hydroxymethylandrosta-4,6-dien-3-one

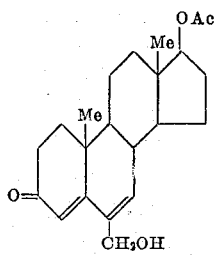

A solution of 2,3-dichloro-5,6-dicyanobenzoquinone (0.4 g.) in 10 ml. of 95% aqueous acetone was added dropwise during two minutes to a stirred solution of 17β-acetoxy-6-hydroxymethyl-3-methoxyandrosta - 3,5 - diene (0.5 g.) in 50 ml. of 95% aqueous acetone. The mixture was stirred for a further two minutes at room temperature, poured into water, and the product isolated with ether. Purification by chromatography on neutral alumina, employing benzene-ether (4:1 v/v) as eluant, gave 17β-acetoxy-6-hydroxymethylandrosta-4,6-dien-3-one, blades, M.P. 188–190° C., (from methylenedichloride-hexane), $[\alpha]_D^{25}+44°$ $\lambda_{max.}^{EtOH}$ 285 mμ (ε=23,120)

Example 15.—11β-hydroxy-6-hydroxymethylandrosta-4,6-diene-3,17-dione

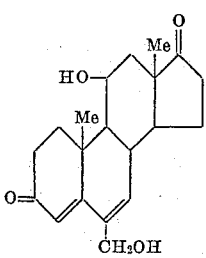

A solution of 6-formyl-11β-hydroxy-3-methoxyandrosta-3,5-dien-17-one (U.S. Patent No. 3,265,717) (1.3 g.) and sodium acetate (1.3 g.) in methanol (105 ml.) was added to a suspension of pre-reduced 5% platinum on charcoal (0.65 g.) in methanol (25 ml.) and the mixture was hydrogenated until one molecular proportion of hydrogen had been absorbed. The catalyst was removed by filtration and the filtrate was concentrated under reduced pressure. The residue was diluted with ether and washed with water. Evaporation of the dried (Na$_2$SO$_4$) ether solution afforded a residue which was crystallised from aqueous methanol containing a trace of pyridine to give 11β-hydroxy-6-hydroxymethyl-3-methoxyandrosta-3,5-dien-17-one, M.P. 154–157° C., $[\alpha]_D=72.6°$ (chloroform), $\lambda_{max.}^{EtOH}$ 250 mμ (ε, 19,320)

A solution of 2,3-dichloro-5,6-dicyanobenzoquinone (0.225 g.) in 95% aqueous acetone (7.5 ml.) was added dropwise during 2 minutes to a stirred solution of 11β-hydroxy-6-hydroxymethyl-3-methoxyandrosta - 3,5 - dien-17-one (0.33 g.) in the same solvent (30 ml.). The mixture was stirred at room temperature for a further 2 minutes and poured onto a column of neutral alumina (10 g.). Elution with acetone gave a solid residue which was triturated with ether and crystallised from acetone-hexane to give 11β-hydroxy-6-hydroxymethylandrosta-4,6-diene-3,17-dione, M.P. 186–186.5° C., $[\alpha]_D+211°$ (chloroform), $\lambda_{max.}^{EtOH}$ 283 mμ (ε, 27,750)

Example 16.—6-hydroxymethylandrosta-4,6-diene-3,17-dione

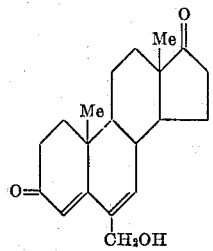

A solution of 2,3-dichloro-5,6-dicyanobenzoquinone (0.09 g.) in 95% aqueous acetone (2.5 ml.) was added dropwise over two minutes to a stirred solution of 6-hydroxymethyl-3-methoxyandrosta-3,5-dien-17-one (0.12 g.) in 95% aqueous acetone. Stirring was continued for a further two minutes and the mixture was poured onto a column of neutral alumina (12 g.). Elution with acetone and crystallisation of the residue from aqueous methanol gave 6-hydroxymethylandrosta-4,6-diene-3,17-dione, M.P. 186–187° C., $[\alpha]_D+125.9°$ (chloroform), $\lambda_{max.}^{EtOH}$ 283 mμ (ε, 21,100)

Example 17.—17α-acetoxy-6-hydroxymethyl-16α-methylpregna-4,6-diene-3,20-dione

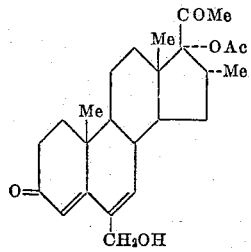

A solution of 2,3-dichloro-5,6-dicyanobenzoquinone (.08 g.) in 95% aqueous acetone (2.5 ml.) was added dropwise over two minutes to a stirred solution of 17α-acetoxy-6-hydroxymethyl-3-methoxy-16α - methylpregna-3,5-dien-20-one (0.135 g.) in 95% aqueous acetone (10 ml.). After a further three minutes at room temperature the mixture was poured onto a column of neutral alumina (10. g.). Elution with acetone, and crystallisation of the residue from aqueous methanol gave 17α-acetoxy-6-hydroxymethyl-16αmethylpregna-4,6-diene-3,20-dione, M.P. 125–127° C., $[\alpha]_D+1.7°$ (chloroform), $\lambda_{max.}^{EtOH}$ 282 mμ (ε 19,400)

Example 18.—11β-hydroxy-6-hydroxymethylpentara-4,6,17(20)-triene-3,21-dione

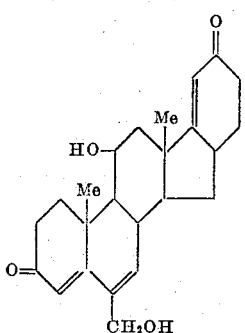

A solution of 2,3-dichloro-5,6-dicyanobenzoquinone (0.25 g.) in 95% aqueous acetone (10 ml.) was added dropwise over two minutes at room temperature to a stirred solution of 11β-hydroxy-6-hydroxymethyl-3-methoxypentara-3,5,17-(20)-trien-21-one [total product obtained by treating 6-formyl-11β-hydroxy-3-methoxypentara-3,5,17(20)-trien-21-one (U.S. Patent No. 3,265,717) (0.5 g.) with lithium borohydride in dry tetrahydrofuran at room temperature for four minutes] (0.5 g.) in 95% aqueous acetone (50 ml.). After a further two minutes at room temperature the reaction mixture was poured onto a column of neutral alumina (40 g.). Elution with acetone afforded a residue which was crystallised from aqueous methanol to give 11β-hydroxy-6-hydroxymethylpentara-4,6,17(20)-triene-3,21-dione, $\gamma_{max.}^{Nujol}$ 3500, 1675, 1630, 1595 cm.$^{-1}$, $\lambda_{max.}^{EtOH}$ 237 mμ (ε, 16,200) and 284 mμ (22,800)

*Example 19.—21-acetoxy-11β,17α-dihydroxy-6-hydroxymethylpregna-4,6-diene-3,20-dione*

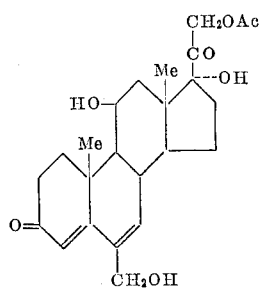

A solution of 2,3-dichloro-5,6-dicyanobenzoquinone (0.3 g.) in 95% aqueous acetone (15 ml.) was added dropwise over two minutes at room temperature to a stirred solution of 21-acetoxy-11β,17α-dihydroxy-6-hydroxymethyl-3-methoxyprenga - 3,5 - dien-20-one [total product obtained by hydrogenation of 21-acetoxy-11β,17α-dihydroxy-6-formyl-3-methoxypregna - 3,5 - dien-20-one (Our U.S. Patent No. 3,095,411) (0.5 g.) in methanol solution in the presence of 5% platinum-charcoal] (0.5 g.) in 95% aqueous acetone (50 ml.). After a further one minute at room temperature the reaction mixture was poured onto a column of neutral alumina (30 g.). Elution with acetone and crystallisation of the residue from aqueous methanol gave 21-acetoxy-11β,17α-dihydroxy-6-hydroxymethylpregna-4,6-diene-3,20-dione, $\gamma_{max.}^{Nujol}$ 3450, 1735, 1720, 1675, 1635 and 1598 cm.$^{-1}$, $\lambda_{max.}^{EtOH}$ 284 mμ (ε, 21,900)

M.P. 134° C., [α]$_D$ —168° (chloroform).

*Example 20.—17β-hydroxy-6-hydroxymethyl-17α-methylandrosta-4,6-dien-3-one*

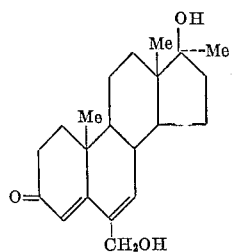

A solution of 2,3-dichloro-5,6-dicyanobenzoquinone (0.4 g.) in 95% aqueous acetone (25 ml.) was added dropwise over two minutes at room temperature to a stirred solution of 6-hydroxymethyl-3-methoxy-17α-methylandrosta-3,5-dien-17β-ol (0.65 g.) in 95% aqueous acetone (50 ml.). After a further one minute at room temperature, the reaction mixture was poured onto a column of neutral alumina (40 g.). Elution with acetone and evaporation of the solvent gave a residue which was crystallised from aqueous methanol to give 17β-hydroxy-6-hydroxymethyl-17α-methylandrosta-4,6-dien-3-one, $\gamma_{max.}^{Nujol}$ 3550, 1675, 1635, 1600 cm.$^{-1}$, $\lambda_{max.}^{EtOH}$ 283 mμ (ε, 24,000)

*Example 21.—Tablets containing 4 mg. of 17α-acetoxy-6-hydroxymethylpregna-4,6-diene-3,20-dione and 0.05 mg. of ethinyloestradiol*

| | |
|---|---:|
| 17α-acetoxy - 6 - hydroxymethylpregna-4,6-diene-3,20-dione _____mg__ | 4 |
| Ethinyloestradiol _____mg__ | 0.05 |
| Industrial methylated spirit, 66 OP, a sufficient quantity | |
| Lactose _____mg__ | 105 |
| Starch _____mg__ | 11.7 |
| Starch paste, 10 percent w./v., a sufficient quantity | |
| Magnesium stearate _____mg__ | 1.3 |
| Starch, sufficient to make _____mg__ | 129.6 |

The ethinyloestradiol is dissolved in a suitable quantity of industrial methylated spirit and the 17α-acetoxy-6-hydroxymethylpregna-4,6-diene-3,20-dione is mixed with the solution to form a slurry. After addition of the lactose and starch, the ingredients are thoroughly mixed together and the mixture granulated with sufficient of the 10 percent starch paste. The resultant granules are tray-dried at 50° C. processed through a No. 20 mesh sieve and the lubricant (magnesium stearate) added, together with enough starch to produce the required weight. After thorough mixing, tablets each weighing 129.6 mg. are compressed from the mixture, using punches of suitable shape and diameter.

*Example 22*

The process of Example 1 is applied to 17β-acetoxy-3 - benzyloxy - 6 - hydroxymethylandrosta - 3,5 - diene. 17β - acetoxy - 6 - hydroxymethylandrosta - 4,6 - dien - 3-one, M.P. 188–190° C., identical with that described in Example 14, is obtained.

*Example 23*

The process of Example 1 is applied to 17β-acetoxy-3 - (2' - hydroxyethoxy) - 6 - hydroxymethylandrosta-3,5 - diene. 17β - acetoxy - 6 - hydroxymethylandrosta-4,6 - dien - 3 - one, M.P. 188–190° C., identical with that described in Example 14 is obtained.

*Example 24.—6-hydroxymethyl-25D-spirosta-4,6-dien-3-one*

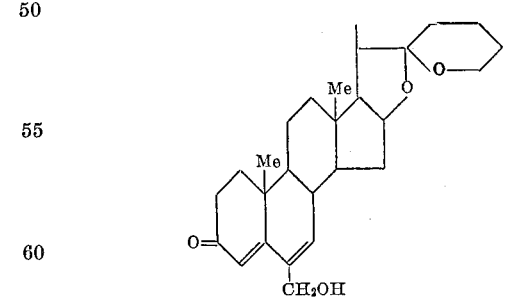

A solution of 2,3-dichloro-5,6-dicyanobenzoquinone (0.6 g.) in 95% aqueous acetone (10 ml.) is added dropwise over two minutes to a stirred solution of 3-ethoxy-6-hydroxymethyl-25D-spirosta-3,5-diene [total product prepared by reduction of 3-ethoxy-6-formyl-25D-spirosta-3,5-diene (our U.S. Patent No. 3,114,750 (1 g.) with sodium borohydride in ethanol] (1 g.) in 95% aqueous acetone (100 ml.) at room temperature. After a further 3-minutes at room temperature the reaction mixture is poured onto a column of neutral alumina (50 g.). Elution with acetone and evaporation of the eluate gave a residue which is crystallised from aqueous methanol to give 6-hydroxymethyl - 25D - spirosta - 4,6 - dien - 3 - one, $\lambda_{max.}^{EtOH}$ 282 m$\mu$ ($\epsilon$, 22,500) and $\gamma_{max.}^{Nujol}$ 3550, 1675, 1630 and 1595 cm.$^{-1}$

*Example 25.—17β-acetoxy-6-hydroxymethylandrosta-4,6-dien-3-one*

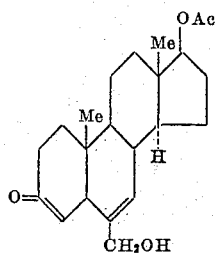

17β - acetoxy - 6 - hydroxymethyl - 3 - methoxyandrosta-3,5-diene (1.8 g.) in methylene dichloride (15 ml.) and pyridine (1.5 ml.) was treated at 0° C. with bromine (0.85 g.) in methylene dichloride (8 ml.). The product was isolated with ether and triturated with ether-hexane to give a crystalline solid which was purified from methylene dichloride-hexane. 17β - acetoxy - 6 - hydroxymethylandrosta-4,6-dien-3-one separated as blades, M.P. 189–190° C., [α]$_D^{25}$ + 44° (c, 0.87 in CHCl$_3$), $\lambda_{max.}^{EtOH}$ 285 m$\mu$ ($\epsilon$, 23,120)

*Example 26.—17α-acetoxy-6-hydroxymethylpregna-4,6-diene-3,20-dione*

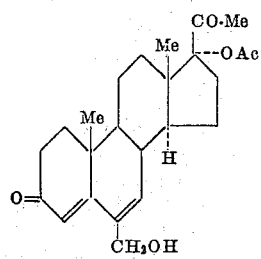

17α - acetoxy - 6 - hydroxymethyl - 3 - methoxypregna-3,5-dien-20-one (1.8 g.) in methylene dichloride (15 ml.) and pyridine (1.5 ml.) was cooled in ice, and the mixture stirred during the dropwise addition, over 5 minutes, of a solution of bromide (0.85 g.) in methylene dichloride (8 ml.). Ether (100 ml.) was added, the ethereal mixture was washed with water, dilute hydrochloric acid, water, dilute aqueous sodium hydrogen carbonate, and finally with water to neutrality. The gum obtained after drying and removal of the solvents, was treated with pyridine (2 ml.), and the solution heated on the steam bath for 5 minutes. Dilution with water (200 ml.) gave a gum which solidified upon trituration. The air-dried crude product was chromatographed on neutral alumina (30 g.). Fractions eluted with ether-acetone (1:1) and acetone were purified from methanol to give 17α-acetoxy-6-hydroxymethylpregna - 4,6 - diene - 3,20 - dione as needles, M.P. 115–122° C.

*Example 27.—21-acetoxy-6-hydroxymethylpregna-4,6,17(20)-triene-3,11-dione*

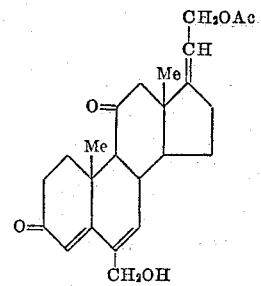

A solution of 2,3-dichloro-5,6-dicyanobenzoquinone (0.3 g.) in 95% aqueous acetone (10 ml.) was added dropwise during two minutes to a stirred solution of 21-acetoxy - 6 - hydroxymethyl - 3 - methoxypregna - 3,5,17-(20)-trien-11-one (0.5 g.) in the same solvent (30 ml.). The mixture was stirred for a further two minutes and poured onto a column of neutral alumina (25 g.). Elution with acetone and purification of the product gave 21-acetoxy - 6 - hydroxymethylpregna - 4,6,17(20) - triene-3,11-dione, $\lambda_{max.}^{EtOH}$ 281 m$\mu$ ($\epsilon$, 22,800)

*Example 28.—21-acetoxy-17α-hydroxy-6-hydroxymethylpregna-4,6-diene-3,11,20-trione*

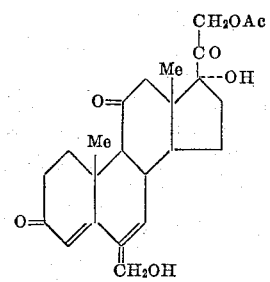

A solution of 2,3-dichloro-5,6-dicyanobenzoquinone (57 mg.) in 95% aqueous acetone (2.4 ml.) was added dropwise over 4 minutes to a stirred solution of 21-acetoxy - 17α - hydroxy - 6 - hydroxymethyl-3-methoxypregna-3,5-diene-11,20-dione (121 mg.) in 95% aqueous acetone (12 ml.). The mixture was then filtered through a column of neutral alumina (8 g.). Elution with acetone gave material which on purification from acetone-hexane afforded crystals of 21-acetoxy-17α-hydroxy-6-hydroxymethylpregna-4,6-diene-3,11,20-trione, M.P. 250° C., [α]$_D$+287° C., (in chloroform), $\lambda_{max.}^{EtOH}$ 281 m$\mu$ ($\epsilon$, 23,550)

*Example 29.—21-acetoxy-11β,17α-dihydroxy-9α-fluoro-6-hydroxymethylpregna-4,6-diene-3,20-dione*

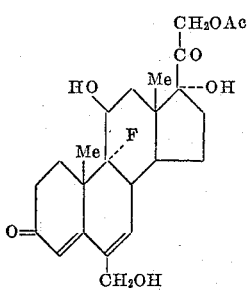

A solution of 2,3-dichloro-5,6-dicyanobenzoquinone (0.4 g.) in 95% aqueous acetone (15 ml.) was added dropwise during two minutes to a stirred solution of 21-acetoxy - 11β,17α-dihydroxy-9α-fluoro-6-hydroxymethyl-3-methoxypregna-3,5-dien-20-one (0.7 g.) in 95% aqueous acetone (40 ml.). After a further two minutes, the reaction mixture was poured onto a column of neutral alumina (40 g.). Elution with acetone and crystallisation of the product gave 21-acetoxy11β,17α-dihydroxy-9α-fluoro-6-hydroxymethylpregna-4,6-diene-3,20-dione, $\lambda_{max.}^{EtOH}$ 284 m$\mu$ ($\epsilon$, 22,500)

*Example 30.—21-acetoxy-6-hydroxymethylpregna-4,6-diene-3,20-dione*

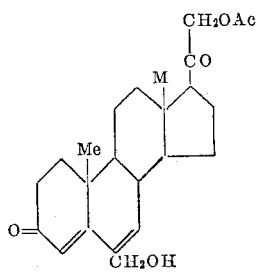

A solution of 2,3-dichloro-5,6-dicyanobenzoquinone (0.3 g.) in 10 ml. of 95% aqueous acetone was added dropwise during two minutes to a stirred solution of 21 - acetoxy-6-hydroxymethyl-3-methoxypregna-3,5-dien-20-one (0.5 g.) in 50 ml. of 95% aqueous acetone. The mixture was stirred for a further two minutes and then filtered through a column of neutral alumina (40 g.). Elution with acetone gave material which was purified from acetone-hexane. 21-acetoxy-6-hydroxymethylpregna-4,6-diene-3,20-dione separated in crystals, $\lambda_{max.}^{EtOH}$ 283 m$\mu$ ($\epsilon$, 22,000)

*Example 31.—β-(17β-hydroxy-6-hydroxymethyl-3-oxo-androsta-4,6-dien-17α-yl)propionic acid lactone*

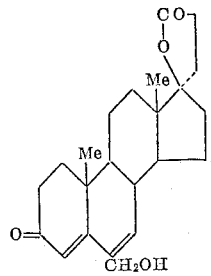

A solution of 2,3-dichloro-5,6-dicyanobenzoquinone (0.1 g.) in 95% aqueous acetone (3 ml.) was added dropwise during two minutes to a stirred solution of β-(17β-hydroxy - 3 - ethoxy-6-hydroxymethylandrosta-3,5-dien-17α-yl)propionic acid lactone (0.15 g.) in the same solvent (10 ml.). After a further two minutes the mixture was filtered through a column of neutral alumina (15 g.). Elution with acetone gave β-(17β-hydroxy-6-hydroxymethyl-3-oxo-androsta-4,6-dien-17α-yl)propionic acid lactone, $_{max.}^{EtOH}$ 283 m$\mu$ ($\epsilon$, 21,700)

*Example 32.—17α-acetoxy-6-acetoxymethylpregna-4,6-diene-3,20-dione*

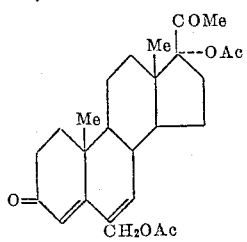

17α-acetoxy - 6 - hydroxymethylpregna-4,6-diene-3,20-dione (the product of Example 1) (1.0 g.) in pyridine (5 ml.) and acetic anhydride (2.5 ml.) was kept overnight at room temperature and the mixture then poured into iced water. The solid was collected, dried and crystallised from acetone-hexane to give 17α-acetoxy-6-acetoxymethylpregna - 4,6 - diene-3,20-dione, as prisms, M.P. 190–193° C., identical in all respects with the product of Example 9.

*Example 33.—17α-acetoxy-6-propionoxymethylpregna-4,6-diene-3,20-dione*

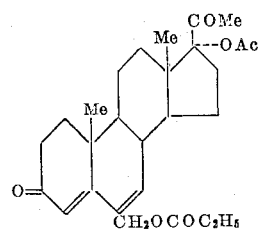

17α-acetoxy - 6 - hydroxymethylpregna-4,6-diene-3,20-dione (the product of Example 1) (1.0 g.) in pyridine (3 ml.) and propionic anhydride (1.5 ml.) was heated on the steam bath for 2 hours. It was then poured into iced water (75 ml.). The product was purified from methanol to give 17α-acetoxy-6-propionoxymethylpregna-4,6-diene-3,20-dione as cubes, M.P. 189° C., $\lambda_{max.}^{EtOH}$ 280 m$\mu$ ($\epsilon$, 24,300)

*Example 34.—17α-acetoxy-6-(β-phenylpropionoxy)-methylpregna-4,6-diene-3,20-dione*

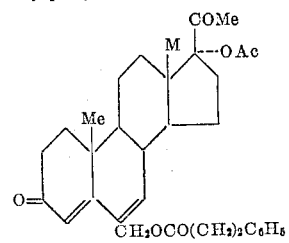

17α - acetoxy - 6 - hydroxymethylpregna-4,6-dien-3,20-dione (the product of Example 1) (0.93 g.) in dry pyridine (2 ml.) was chilled in an ice-salt mixture. β-Phenylpropionyl chloride (0.3 ml.) was added dropwise to the stirred mixture which was then stored overnight at 0° C. It was then diluted with iced water (40 ml.), and the gummy product allowed to settle. The supernatant liquor was decanted, and the residual gum triturated with ether to give a crystalline solid. This was purified from acetone-hexane to give 17α-acetoxy-6-(β-phenylpropionoxy)methylpregna-4,6-diene-3,20-dione, prisms, M.P. 183° C., $\lambda_{max.}^{EtOH}$ 280 m$\mu$ ($\epsilon$, 23,600)

*Example 35.—17α-acetoxy-6-phenoxyacetoxymethylpregna-4,6-diene-3,20-dione*

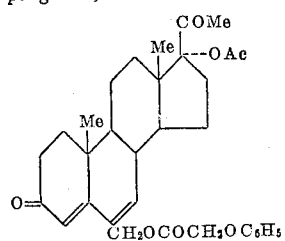

17α-acetoxy-6-hydroxymethylpregna - 4,6 - diene-3,20-dione (the product of Example 1) (0.5 g.) was added to a stirred, ice-cold, mixture of phenoxyacetic acid (0.5 g.) in dry pyridine to which toluene p-sulphonyl chloride (0.65 g.) had been added. Stirring and cooling were continued for 1 hour, and the mixture was then poured into iced water. A solution of the product in ethanol (10 ml.) was diluted with much water and chilled and triturated to give a solid. Purification from aqueous methanol gave 17α - acetoxy-6-phenoxyacetoxymethylpregna-4,6-diene-3,20-dione as rods, M.P. 169–170° C., $\lambda_{max.}^{EtOH}$ 277 m$\mu$ ($\epsilon$, 24,000)

Example 36.—17α-acetoxy-6-caproyloxymethylpregna-4,6-diene-3,20-dione

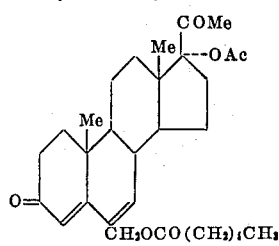

17α-acetoxy-6-hydroxymethylpregna - 4,6 - diene-3,20-dione (the product of Example 1) (1.0 g.) in dry pyridine (2.0 ml.) was stirred and cooled in ice-salt. n-Hexoyl chloride (0.36 ml.) was added dropwise, and the mixture stirred a further 5 minutes and then stored overnight at 0° C. The mixture was then diluted with iced-water (70 ml.). The product was isolated with benzene and chromatographed on neutral alumina (30 g.). Fractions eluted with benzene-ether (1:4) were triturated with hexane to give 17α-acetoxy-6-caproyloxymethylpregna-4,6-diene-3,20-dione, $\lambda_{max.}^{EtOH}$ 280 mμ (ε, 22,600)

Example 37.—17α-acetoxy-6-acetoxymethyl-16-methylenepregna-4,6-diene-3,20-dione

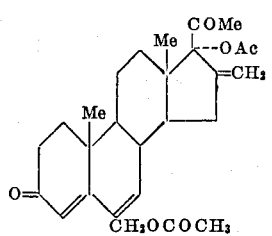

17α-acetoxy-6-hydroxymethyl - 16 - methylenepregna-4,6-diene-3,20-dione (the product of Example 12) (1.0 g.) in pyridine (4 ml.) and acetic anhydride (2 ml.) was heated at 100° C. for 1 hour. The mixture was poured into iced water (300 ml.) and the product isolated with ether. Purification from aqueous methanol gave 17α-acetoxy-6-acetoxymethyl - 16 - methylenepregna-4,6-diene-3,20-dione, M.P. 85° C., $\lambda_{max.}^{EtOH}$ 279 mμ (ε, 23,800)

Example 38.—17α-acetoxy-16-methylene-6 - propionoxymethylpregna-4,6-diene-3,20-dione

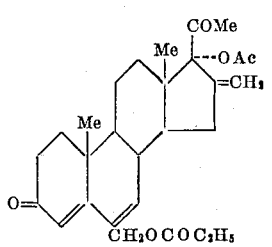

17α-acetoxy-6-hydroxymethyl-16-methylenepregna - 4,6-diene-3,20-dione (the product of Example 12) (0.5 g.) in pyridine (3 ml.) and propionic anhydride (1.5 ml.) was heated at 100° C. for 2 hours, and then poured into iced water (75 ml.). The product was purified from aqueous methanol and gave 17α-acetoxy-16-methylene - 6-propionoxymethylpregna-4,6-diene-3,20-dione as prisms, M.P. 117–119.5° C., $\lambda_{max.}^{EtOH}$ 289 mμ (ε, 24,700)

Example 39.—17α-acetoxy-16-methylene-6-(β-phenylpropionoxy)methylpregna-4,6-diene-3,20-dione

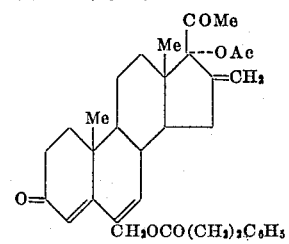

A stirred solution of 17α-acetoxy-6-hydroxymethyl-16-methylenepregna-4,6-diene-3,20-dione (the product of Example 12) (1.0 g.) in dry pyridine (5.2 ml.) at 0° C. was treated with β-phenylpropionyl chloride (0.3 ml.) added dropwise during 3 minutes. The mixture was stirred a further 5 minutes and then stored at 0° C. overnight. Thereafter, it was diluted with water (40 ml.) and the product isolated with ether. Purification from aqueous ethanol gave 17α-acetoxy-16-methylene-6 - (β - phenylpropionoxy)methylpregna-4,6-diene-3,20-dione as prisms, M.P. 95–99° C., $\lambda_{max.}^{EtOH}$ 279 mμ (ε, 25,100)

Example 40.—17α-acetoxy-16-methylene-6-phenoxyacetoxymethylpregna-4,6-diene-3,20-dione

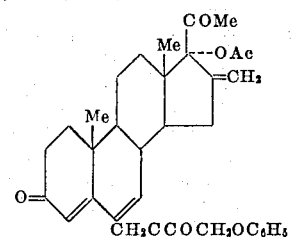

Phenoxyacetic acid (0.5 g.) in dry pyridine (14 ml.) was treated with toluene p-sulphonyl chloride (0.65 g.) and the mixture stirred and cooled in ice. 17α-acetoxy-6-hydroxymethyl-16-methylenepregna-4,6 - diene - 3,20-dione (the product of Example 12) (0.5 g.) was then added, and the stirring and cooling continued for 1½ hours. The mixture was poured into iced water and the gummy product purified from ethanol to give 17α-acetoxy-16-methylene-6-phenoxyacetoxymethylpregna-4,6 - diene-3,20-dione in the form of rods, M.P. 177–181° C., $\lambda_{max.}^{EtOH}$ 276 mμ (ε, 24,000)

Example 41.—17α-acetoxy-6-caproyloxmethyl-16-methylenepregna-4,6-diene-3,20-dione

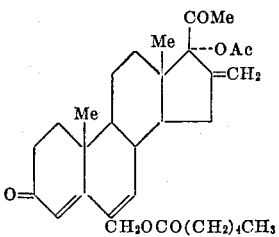

17α-acetoxy-6-hydroxymethyl-16-methylenepregna - 4,6-diene-3,20-dione (the product of Example 12) (0.5 g.) was added to a stirred mixture of n-caproic acid (0.46 g.) and toluene-p-sulphonyl chloride (0.65 g.) in dry pyridine at 0° C. The mixture was stirred for 1 hour at 0° C., poured into cold water, and the product isolated with ether. Purification from aqueous methanol gave 17α-acetoxy-6-n-caproyloxmethyl-16 - methylenepregna - 4,6-diene-3,20-dione, M.P. 67–73° C., $\lambda_{max.}^{EtOH}$ 280 mμ (ε, 22,900)

We claim:
1. A process for the preparation of 6-hydroxy- or acyloxymethyl-3-oxo-4,6-dienic steroids having the formula

where R is H or an acyl group having up to 10 carbon atoms, and S is the remainder of the steroid molecule, which process comprises treating a corresponding 3-enol ether of a 6-hydroxymethyl steroid or acyl derivative thereof having the formula

where R and S are as hereinabove defined and R' is an alkyl, chloralkyl, hydroxyalkyl, cycloalkyl or alkaryl group, with a quinone dehydrogenating reagent.

2. A process as claimed in claim 1 wherein the 3-enol ether is treated with 2,3-dichloro-5,6-dicyanobenzoquinone in an aqueous water miscible organic solvent.

3. A process as claimed in claim 2 wherein the water miscible organic solvent is selected from the group consisting of acetone, lower aliphatic alcohols, dioxan, tetrahydrofuran and dimethylformamide.

4. A process as claimed in claim 1 wherein the dehydrogenating agent is selected from the group consisting of 2,3-dicyano-1,4-benzoquinone, 2,3-dibromo-5,6-dicyanobenzoquinone, chloranil and tetrachlorodiphenoquinone.

5. A compound selected from the group consisting of 6-hydroxymethyl-pregna-4,6-dienic-3,20-diones and 6-hydroxymethylandrosta-4,6-dienic-3-ones and their corresponding 6-acyl derivatives, wherein the said acyl group is a residue of an alkanoic acid having up to 10 carbon atoms.

6. A compound selected from the group consisting of 17α - acetoxy - 6 - acyloxymethyl - pregna - 4,6 - diene-3,20-diones, wherein acyloxy is selected from the group consisting of acetoxy, propionoxy, β-phenylpropionoxy, phenoxyacetoxy, and caproyloxy, and the 16-methylene derivatives thereof.

7. 6 - hydroxymethylandrosta - 4,6 - diene - 3,17-dione.

8. 17β - hydroxy - 6 - hydroxymethyl - 17α - methylandrosta-4,6-dien-3-one.

9. 11β - hydroxy - 6 - hydroxymethylpentara - 4,6, 17(20)-triene-3,21-dione.

10. 21 - acetoxy - 11β,17α - dihydroxy - 6 - hydroxymethylpregna-4,6-diene-3,20-dione.

11. 21 - acetoxy - 17α - hydroxy - 6 - hydroxymethylpregna-4,6-diene-3,11,20-trione.

12. 21 - acetoxy - 11β,17α - dihydroxy - 9α - fluoro - 6-hydroxymethylpregna-4,6-diene-3,20-dione.

13. 17α - acetoxy - 6 - acetoxymethyl - 16 - methylenepregna-4,6-diene-3,20-dione.

14. 17β - acetoxy - 6 - hydroxymethyl - 19 - nor - androsta-4,6-dien-3-one.

15. 6 - hydroxymethyl - 16α,17α-isopropylidenedioxypregna-4,6-diene-3,20-dione.

16. 17α - acetoxy - 6 - hydroxymethyl - 16 - methylenepregna-4,6-diene-3,20-dione.

17. 21 - acetoxy - 6 - acetoxymethyl - 17α - hydroxypregna-4,6-diene-3,11,20-trione.

18. 17α - acetoxy - 6 - hydroxymethylpregna - 4,6-diene-3,20-dione.

19. 17α - acetoxy - 6 - acetoxymethylpregna - 4,6-diene-3,20-dione.

20. 17β - acetoxy - 6 - hydroxymethylandrosta - 4,6-dien-3-one.

21. 11β - hydroxy - 6 - hydroxymethylandrosta - 4,6-diene-3,17-dione.

22. 17α - acetoxy - 6 - hydroxymethyl - 16α - methylpregna-4,6-diene-3,20-dione.

23. 21 - acetoxy - 6 - hydroxymethylpregna - 4,6, 17(20)-triene-3,11-dione.

24. 21 - acetoxy - 6 - hydroxymethylpregna - 4,6-diene-3,20-dione.

25. β - (17β - hydroxy - 6 - hydroxymethyl - 3 - oxoandrosta-4,6-dien-17α-yl)propionic acid lactone.

26. A pharmaceutical preparation comprising a 6-hydroxy- or acyloxymethyl-3-oxo-4,6-dienic steroid according to claim 5 in admixture with one or more solid or liquid pharmaceutically acceptable inert carriers.

27. A pharmaceutical preparation in dosage unit form comprising 17α - acetoxy - 6 - hydroxymethylpregna - 4,6-diene-3,20-dione in admixture with lactose, magnesium stearate and starch.

28. A pharmaceutical preparation according to claim 27 including also ethynyl oestradiol.

References Cited

UNITED STATES PATENTS 3,257,388  6/1966  Bowers et al. _____ 260—239.55

ELBERT L. ROBERTS, *Primary Examiner.*

H. FRENCH, *Assistant Examiner.*